United States Patent [19]
Rishi et al.

[11] Patent Number: 5,953,530
[45] Date of Patent: Sep. 14, 1999

[54] METHOD AND APPARATUS FOR RUN-TIME MEMORY ACCESS CHECKING AND MEMORY LEAK DETECTION OF A MULTI-THREADED PROGRAM

[75] Inventors: Alok Rishi, El Granada; Jon A. Masamitsu, Livermore, both of Calif.

[73] Assignee: Sun Microsystems, Inc., Palo Alto, Calif.

[21] Appl. No.: 08/976,448

[22] Filed: Nov. 25, 1997

Related U.S. Application Data

[63] Continuation of application No. 08/384,884, Feb. 7, 1995, abandoned.

[51] Int. Cl.[6] .......................... G06F 11/00; G06F 11/30; G06F 9/44
[52] U.S. Cl. .............. 395/704; 395/183.14; 395/185.01; 395/705
[58] Field of Search .................. 395/183.01, 183.13, 395/183.14, 180, 185.01, 672, 677–678, 685, 701, 704, 680, 705, 183.11

[56] References Cited

U.S. PATENT DOCUMENTS

| | | | |
|---|---|---|---|
| 5,179,702 | 1/1993 | Spix et al. ............................. | 395/672 |
| 5,581,697 | 12/1996 | Gramlich et al. ................... | 395/183.11 |
| 5,675,803 | 10/1997 | Preisler et al. .......................... | 395/704 |
| 5,715,387 | 2/1998 | Barnstijn et al. ................... | 395/183.14 |
| 5,727,178 | 3/1998 | Pletcher et al. .......................... | 711/202 |

OTHER PUBLICATIONS

Sun Microsystems, Inc., (SunSoft) Solaris SunOS 5.0 Multithread Architecture, A White Paper, 1991, M.L. Powell et al., pp. 1–32.

*Primary Examiner*—James P. Trammell
*Assistant Examiner*—Cuong H. Nguyen
*Attorney, Agent, or Firm*—Park & Vaughan

[57] ABSTRACT

The present invention is a system and method for a "debugger Run-Time-Checking for valid memory accesses for multi-threaded application programs" (hereinafter "RTC/MT") wherein a run-time process which includes multiple threads running either serially or concurrently, may be monitored by a debugger program and memory access errors detected and correctly attributed to the process thread encountering the error. The RTC/MT system of the present invention also provides an apparatus and method which monitors and reports memory leaks as required for multi-threaded target programs.

25 Claims, 8 Drawing Sheets

TIGHTLY-COUPLED MULTIPROCESSOR SYSTEM

METHOD AND APPARATUS FOR RUN-TIME MEMORY ACCESS CHECKING AND MEMORY LEAK DETECTION OF A MULTI-THREADED PROGRAM

This is a continuation of application Ser. No. 08/384,884, filed Feb. 7, 1995 now abandoned.

BACKGROUND OF THE INVENTION

1. Field of the Invention

This invention relates to the field of multi-processing computers, multi-threaded computer systems development and run-time debugging. More specifically, the invention is a method and apparatus for run-time memory access checking of a target multi-threaded system.

2. Background

The invention described in this application is related to the debugger system described in U.S. Pat. No. 5,581,697 issued on Dec. 3, 1996, titled "Method and Apparatus for Run-Time Error Checking Using Dynamic Patching" by Wayne C. Gramlich, Sunnyvale, Calif.; Achut Reddy, San Jose, Calif.; and Shyam Desirazu, Foster City, Calif., and related to the system described in the U.S. Pat. No. 5,675,803 issued on Sep. 7, 1987 titled "Method & Apparatus for a Fast Debugger Fix & Continue Operation" by Thomas Preisler, Wayne C. Gramlich, Eduardo Pelegri-Llopart and Terrence Miller, both of which applications are hereby incorporated herein by reference.

The development of computer systems has progressed from traditional uni-processor systems to the use of systems with multiple central processor units (CPUs) in a given computer system. Such systems are designated "Multi-processor" hardware systems. Programming systems, including operating systems, have been designed to make use of multiple CPUs in a system by permitting application programs to be developed which use multiple threads which may be executed concurrently on the several CPUs. This requires additional control mechanisms to synchronize the different parts of an application which might be running simultaneously on two or more CPUs. Such new programing capabilities are generally embodied in the new programming paradigm called "multi-threading." A "thread of control" or more simply a "thread" is a sequence of instructions being executed in a program. A thread has a program counter (PC) and a stack to keep track of local variables and return addresses. Threads execute independently. Threads share the process instructions and most of its data, as well as share most of the operating system state of a process. Each thread may make arbitrary system calls. Threads and the associated control and services of a multithreaded system (including synchronization services) may be implemented as objects. Synchronization techniques which are implemented as objects include mutual exclusion (mutex) locks, semaphores, condition variables, and readers/writer locks. For more information on multithreads as applied to application programs, see the paper titled "SunOS Multi-thread Architecture" by M. L. Powell, S. R. Kleiman, S. Barton, D. Shah, D. Stein, M. Weeks, Proceedings of the USENIX Conference—Winter '91—Dallas, Tex. pages 65–79. See also the aforementioned text by Silbershatz et al, at pages 96–97, and 597–629.

Debugger programs written for uni-processor (i.e. single CPU) systems will generally not function correctly when testing application programs which are written to function in a multi-threaded mode. In the past, attempts have been made to develop debugging systems which check memory accesses during run-time but these debuggers are designed with uni-processor based application programs in mind. One such attempt was to interleave additional instructions adjacent to every memory access instruction in an object code module and then load and execute the augmented or new object code module in order to test the status of the addressed memory location during the execution of the augmented or new object code module. This method is used by the Purify program of Pure Software, Inc. which is described in U.S. Pat. Nos. 5,193,180 issued Mar. 9, 1993 and 5,335,344 issued Aug. 2, 1994. The Purify system reads object modules created by a compiler and interleaves instructions into the code of a target object module for every memory access instruction in the original object code module, thereby creating a new augmented object module which can then be linked to related object code and library modules and loaded into a computer and executed. This Purify approach is designed for single-threaded application programs and has been shown to incorrectly test a target application designed to be multi-threaded. This is due to the fact that each thread has its own Program Counter (PC) and stack and a debugger must be able to handle these separate stacks and report errors according to the particular thread which contained the error. Sun Microsystems, Inc., the assignee of this invention, has a run-time-checking feature in its dbx debugger Run-Time-Checking (RTC) system which is sold under the title of SPARCWorks, a collection of several developer tools. Unlike the Purify product, Sun's debugger product operates on a target application by loading the original object code module into a computer under the control of the debugger and starting a process reflecting the target application. If run-time-checking is requested by the user, the RTC section of the debugger overlays every memory reference instruction with a branch to instrumentation code and library modules designed to test the validity of memory locations being accessed. However this RTC system itself was originally designed to operate on single-threaded processes and it too requires modification to handle concurrently operating multiple threads with their individual stacks and program counters, etc. It is desirable that run-time debugging and especially memory access checking tools be available for multi-threaded application programs.

The present invention comprises a memory access checking system, designated Run Time Checking for Multi-Threaded applications (RTC/MT), which can test multi-threaded application programs, whether these application programs are tested on a uni-processor or on a multi-processor, and can correctly keep track of which thread of several possibly concurrently executing threads may encounter a memory access error, and can correctly report to the user the location in question and the thread attempting to access it.

SUMMARY OF THE INVENTION

The present invention overcomes the disadvantages of the above described systems by providing an economical, high performance, system and method for debugging a multi-threaded target program using a memory access checking system which is itself multi-thread safe. More specifically, according to one aspect of the invention, a computer implemented method for memory access checking of a multi-threaded target program is claimed, wherein a debugger program which does the checking is itself multi-thread safe ("MT safe") and wherein this MT safe debugger maintains a status of all memory locations as they are allocated and deallocated by the target program and thereafter reports any errors which may occur when the target program attempts to access a memory location in a way which is deemed invalid for that location.

According to a second aspect of the invention a computer system for memory access checking of a multi-threaded target program is claimed, wherein a multi-threaded operating system and a multi-thread safe debugger mechanism operate to maintain memory location status and to check this status and report any errors that occur when the target program accesses a location in an invalid way:

According to another aspect of the invention, a method and an computer system are claimed, wherein a multi-threaded safe debugger system maintains memory leak status and reports errors when required indicating any "memory leaks" which are defined as memory locations which were allocated but which are inaccessible by the target program. Such leaks occur either because a routine may terminate without freeing up previously allocated memory which is no longer used or because a pointer to the allocated memory somehow was destroyed or deleted so that the memory location is no longer accessible.

DESCRIPTION OF THE DRAWINGS

The objects, features and advantages of the system of the present invention will be apparent from the following description in which.

NOTATIONS AND NOMENCLATURE

Figure 1:
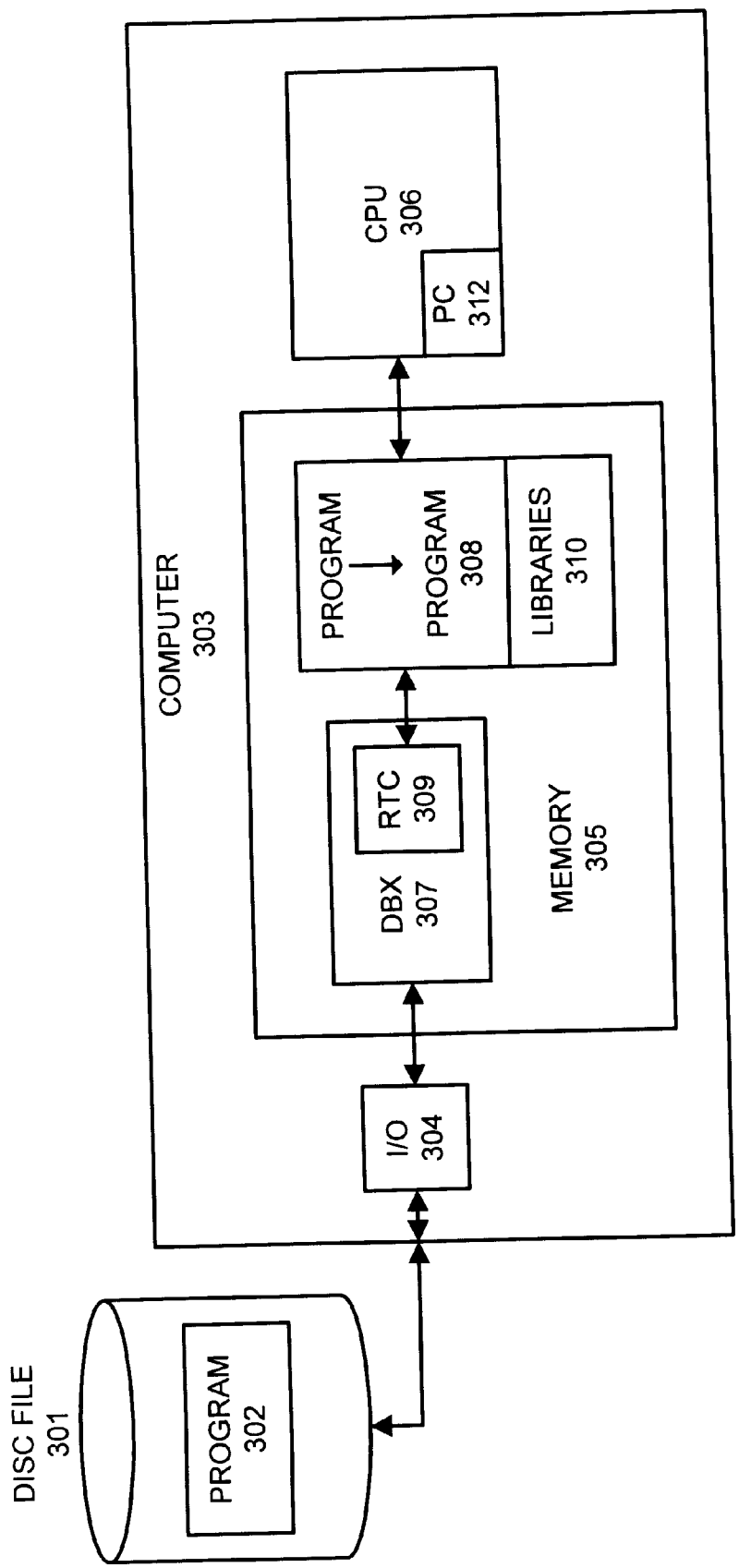
FIG. 1 is a computer block diagram of the run-time error checking system using dynamic patching.

The detailed descriptions which follow are presented largely in terms of procedures and symbolic representations of operations on data bits within a computer memory. These procedural descriptions and representations are the means used by those skilled in the data processing arts to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be bourne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or similar devices. In all cases there should be bourne in mind the distinction between the method operations in operating a computer and the method of computation itself. The present invention relates to method steps for operating a computer in processing electrical or other (e.g., mechanical, chemical) physical signals to generate other desired physical signals.

The present invention also relates to apparatus for performing these operations. This apparatus may be specially constructed for the required purposes or it may comprise a general purpose computer as selectively activated or reconfigured by a computer program stored in the computer. The procedures presented herein are not inherently related to a particular computer or other apparatus. In particular, various general purpose machines may be used with programs written in accordance with the teachings herein, or it may prove more convenient to construct more specialized apparatus to perform the required method steps. The required structure for a variety of these machines will appear from the description given.

DESCRIPTION OF THE PREFERRED EMBODIMENT

Apparatus and methods for dynamic patching for run-time checking and for rapid debugging of a multi-threaded target program are disclosed. In the following description, for purposes of explanation, specific instruction calls, modules, etc., are set forth in order to provide a thorough understanding of the present invention. However, it will be apparent to one skilled in the art that the present invention may be practiced without these specific details. In other instances, well known circuits and devices are shown in block diagram form in order not to obscure the present invention unnecessarily. Similarly, in the preferred embodiment, use is made of uni-processor and multi-processor computer systems as well as the Solaris operating system, all of which are made and sold by Sun Microsystems, Inc. however the present invention may be practiced on other computer hardware systems and using other compatible operating systems.

The present invention is a system and method for a "debugger Run-Time-Checking for valid memory accesses for multi-threaded application programs" (hereinafter "RTC/MT") wherein a run-time process which includes multiple threads running either serially or concurrently, may be monitored by a debugger program and memory access errors detected and correctly attributed to the process thread encountering the error. The invention described in this application is related to the Run Time Checking system described in U.S. patent application Ser. No. 08/189,089 filed on Jan. 28, 1994, titled "Method and Apparatus for Run-Time Error Checking Using Dynamic Patching" by Wayne C. Gramlich, Sunnyvale, Calif.; Achut Reddy, San Jose, Calif.; and Shyam Desirazu, Poster City, Calif., and related to the system described in the U.S. patent Continuation-in-part application Ser. No. 08/299,720 filed on Sep. 01, 1994 titled "Method & Apparatus for a Fast Debugger Fix & Continue Operation" by Thomas Preisler, Wayne C. Gramlich, Eduardo Pelegri-Llopart and Terrence Miller, both of which applications are hereby incorporated herein by reference. The first of the two applications identified above (the parent of the two applications) discloses and claims Run Time Checking related to a target application program being debugged while the second continuation-in-part application additionally discloses and claims the Fix and Continue error processing system for debugging the target application program. The parent application utilizes dynamic patching to check for program errors during program run-time which are not detected by the compiler. Such run-time errors are checked by patching a run-time process corresponding to the program such that at every point where the program is about to access memory, the program instead branches to a different location where checks on the memory address that is about to be accessed are performed. If the memory address that the program is about to access is invalid, an error is recorded, otherwise if the memory address is valid then the program will continue execution. The actual patching process is done inside the RTC module. It will be recognized that if the target program to be debugged is a multi-threaded program then the debugger not only must be able to keep track of whether multiple threads are executing concurrently, but must itself be capable of handling multiple accesses of its routines in a safe way. That is the RTC module must be multi-thread safe ("MT safe"). If the RTC module is testing a multi-threaded application program process then RTC must recognize that stacks of other threads exist and therefore accesses to memory locations on these other stacks are legal accesses, and therefore each check for an error must be made with knowledge of the activities of all threads and each error detected must be reported with reference to the particular thread wherein the error was observed. Such multi-threaded error checking capability is the subject of the present invention claimed in this application. In the sections which follow, the preferred embodiment is described as a modification of the Sun Microsystems, Inc. single-threaded system of Run-Time Checking, which is described in detail in the aforementioned parent application which is incorporated herein by reference and which for completeness, is described in some detail below. While the multi-threaded version of run time checking (RTC/MT) will operate on computer hardware with one CPU or multiple CPUs, it is clear that multi-threaded applications are most effectively run on multi-processor systems. Therefore this description is followed by a summary description of a typical multi-processor configuration capable of executing multi-threaded processes concurrently. It will be appreciated that the present invention may be easily adapted to function on any number of vendor's multi-processor systems such as IBM, Hewlett Packard, DEC, MIPS, etc. and to function with target application programs to be debugged from various software vendors such as IBM, Hewlett Packard, DEC, MIPS, Microsoft, Novell, etc.

FIG. 1 is a system block diagram for a computer system with run-time error checking using dynamic patching. It will be appreciated that the computer system illustrated in FIG. 1 is shown in conceptual form, and that many additional circuits, devices and interconnections of the computer system are not shown in order to not obscure the present invention.

The Single Threaded RTC System

FIG. 1 illustrated the single threaded RTC system. As shown in FIG. 1, a target program image is read into a debugger program 307 (dbx) through an I/O device 304, and stored in memory to provide an in-memory copy 308 of a program 302. A module within the debugger program 307 referred to as a "run-time checking" (RTC) module 309 handles the user interface, printing of error messages and also handles the patching of the in-memory process 308 corresponding to the program 302. A shared library (Libraries) module 310 is loaded into the computer memory 305, and performs the run-time checking. In the preferred embodiment the principal library routine used is designated "librtc.so".

This in-memory copy of the program (the process) 308 becomes a patched process, called "instrumented program" herein. The patches are applied only to this in-memory copy 308 of the target program and not to the original program 302 stored on disk 301. Therefore, the original file 302 never changes and there is never any relinking of the file required for the executable program. In addition, the program 302 does not have to be pre-patched. Instead, the patches are applied when the checking is initiated. The choice by the user is therefore delayed until the actual run-time rather than before execution. The CPU 306 controls the program execution of the debugger 307 and the program under test 308. The CPU 306 contains a Program Counter ("PC") 312 which points to the next instruction to be executed.

The Sun dbx debugger program 307 can dynamically load libraries at run-time that were not specified at link time. Since such loading of libraries is done dynamically in the debugger program 307, the RTC module 309 can trap all calls to load a new library in the program and may apply patches just before such libraries are executed.

In summary, with the Sun dbx debugger there is no necessity for pre-patching a program before execution. Instead, the patches may be applied when the checking is initiated, thereby delaying the choice of the user until the actual run-time. Furthermore, by not modifying the target program object code at all and thus eliminating the need to relink the object files to produce the executable program, the approach of the present method avoids the use of extra links. Finally, the patches are applied to an in-memory process initiated from the existing target program such that a fully instrumented process is achieved.

Figure 2:
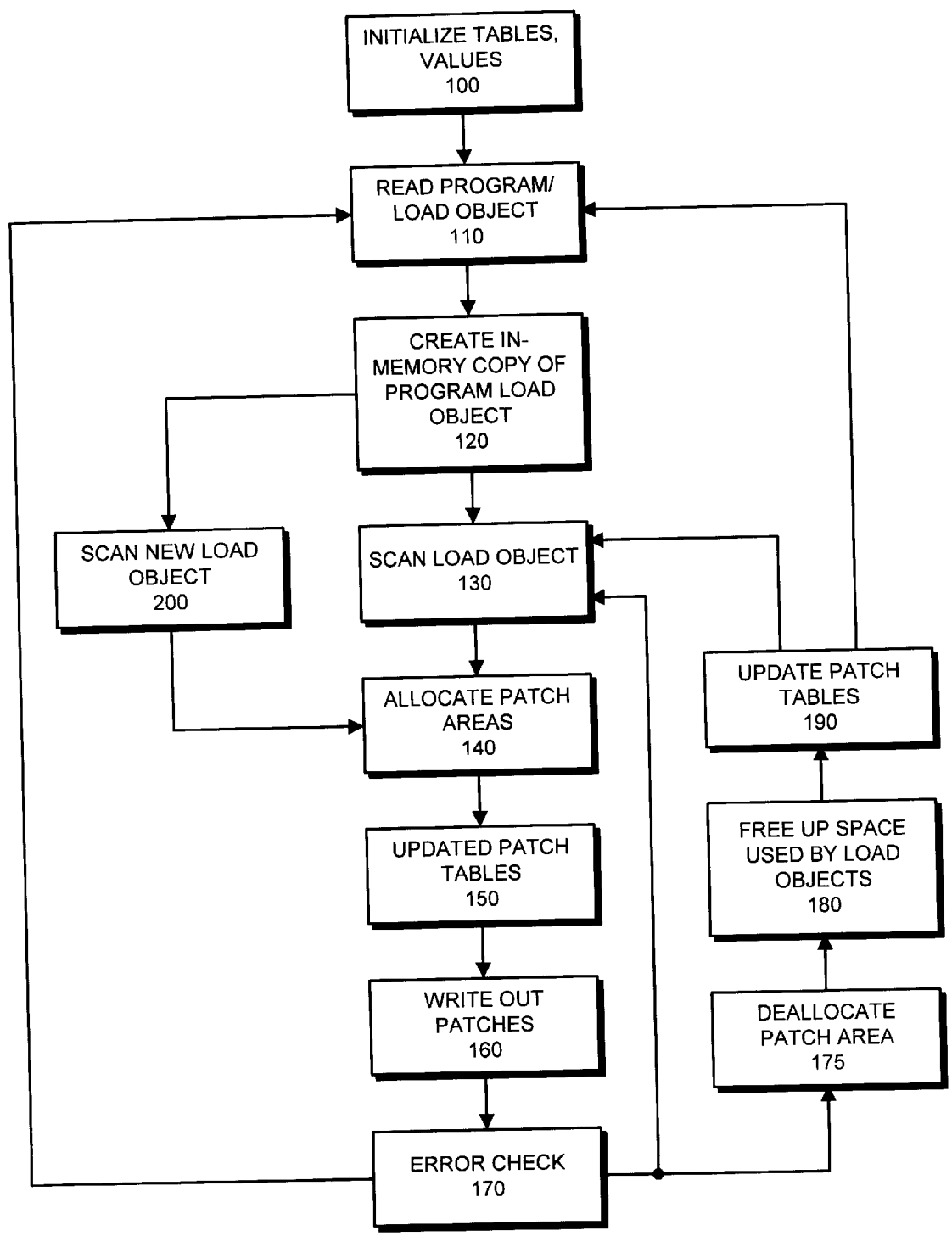
FIG. 2 is a general flow chart of dynamic patching for the run-time error checking.

Reference is now made to FIG. 2, wherein a general flow chart for the method of dynamic patching for the run-time checking (hereinafter "RTC") in the Sun dbx debugger is illustrated. In order to detect memory access errors, all memory access instructions, including accesses to the stack and system calls that access user memory are intercepted. Such memory access instructions are then verified as to validity of memory address being accessed before continuing instruction execution.

For such error checking, the RTC scans (or searches) the functions that are being checked for the location of memory access instructions that require patching. Next, the locations that need to be patched are identified as patch sites. Furthermore, the original instructions at these patch sites are then replaced by a branch to a patch area.

As illustrated in FIG. 2, block 100, space is allocated for the patch tables and the patch tables and values are initialized. Next, as illustrated in block 110, the program to be error checked is initially read and loaded as it exists on the disk file. Such program is normally loaded in portions (load objects) as they are accessed by the user. However, by going through the steps illustrated in FIG. 2, the debugger will cause essentially all of the program to be accessed. Thus, as a result, when the debugger program has completed its processes, all of the program will have been patched. This debugger program is a special process that is able to read and write other processes and therefore able to change the program image process that is within the memory. All operations described within FIG. 2 are performed by the RTC module within the debugger program. As can be appreciated by FIG. 2, block 130, the debugger program creates a list of load objects. The load objects contain segments/functions within the program which have memory access instructions. The program may consist of a number of these load objects. The first type of load object is the program's main routine, which is the user part of the program. There are also shared libraries that the program uses, which are another type of load object. Both types of load objects are required in order to run the program. Once the debugger program has received a list of the load objects, it will scan the load objects, searching for instructions that it is going to patch later on. The only part of the load object the debugger program looks at during this instruction-by-instruction scan are the instructions themselves, i.e., the text, but not the data.

While the debugger program is identifying the patch sites, the debugger program also accumulates information regarding these patch sites, including patch site address, patch area address, patch type (i.e. memory access instruction type), whether a particular patch site should be patched, and the size of memory being accessed. Every load object has a table for the aforementioned patch site information, with one entry in the table for each patch site. The patch type or the type of memory access instruction for patching purposes defines the size of its corresponding section of patch area where the error checking is processed. A check command or uncheck command issued by a user for a particular patch site will indicate whether or not errors will be reported for that particular patch site. More specifically, the check command indicates that the particular patch site should report errors and the uncheck command conversely indicates that errors for the particular patch site should not be reported. At the very end of the scan, the debugger program comes up with a total size of the section of patch area that the debugger program is going to need in order to accommodate the patch sites found. The identification of a patch site only needs to be done once for a load object and any subsequent execution pass only requires locating a space for the corresponding section of the patch area space and installing the patch. The total size needed for the patch area section is recorded and a list of the patch area section sizes is produced. This list of patch area section sizes is the input to the next step, step 140, in which memory space is actually allocated to the patch area. In step 140, the debugger program takes the list of patch area section sizes and attempts to allocate space for them. The debugger program first creates an initial map of the address space to see where everything is laid out. The system maps the load objects in various places in memory. Such mapping of load objects is not necessarily contiguous and there are holes in the address space. The job of the debugger program is to identify these holes and to map these lists of requests for space needed to these holes.

In one embodiment of the Sun dbx debugger RTC program, the address space data is accessed to obtain a list of all segments in the address space along with each segment's starting address and size. These segments may consist of text, data, stack and/or heap segments. The space between such segments, called "holes" herein, are used to allocate space for the sections of the patch area. A list containing the starting address of each text segment, ending address of each text segment and the size of sections of the patch area, sorted by ascending order of the starting address of each text segment, is obtained from the previous step 130. In step 140, a list of holes with starting addresses and segment sizes of the holes sorted by starting address of each hole is generated. The aforementioned holes are compared to the sizes of sections of the patch area needed by first checking for holes with address locations higher than the patch sites for the corresponding sections of the patch area. Given a hole with a size larger than the size of the section of the patch area for which space is to be allocated and the hole is not immediately before a stack segment, then the section of the patch area is allocated the hole space. After going through the list of the patch area section sizes and the list of the holes and allocating the holes to the sections of the patch area, the list of unallocated patch area sections produced will be scanned in descending order. The holes at lower addresses than the patch sites which are greater than or equal to the corresponding sections of the patch area are searched. The holes which are greater than or equal to particular section of the patch area are allocated to that section of the patch area. Such section of the patch area is placed at the bottom of the hole. Any patch sites for which its corresponding section of patch area is not allocated at the end of this step is not patched and the user will be warned that the request for error check was not met. In step 150, the system takes the information of where it found all the sections of the patch area and stores that information in the patch table and updates the address information in these patch tables.

In step 160, spaces for sections of the patch area are allocated and all the instructions in the original target program that need to be patched are identified. Now the patches actually get written out at this stage and at the completion of this stage the program is completely transformed to a fully instrumented process. The table of data containing the patch site information, as described previously (i.e.,containing the patch site address, the patch area address, the patch type, whether the patch site is to be patched, and the size of memory being referenced), is used to determine the patch sites. If the pages containing the patch site and the corresponding section of the patch area have not been read, they are read and the patch type is written out into the corresponding section of the patch area. The original instruction at the patch site is replaced with a branch instruction to the corresponding section of the patch area, and such displaced original instruction is placed in the corresponding section of the patch area. This patching is done regardless of whether an uncheck command is issued for this particular patch site. If on the other hand an uncheck command is issued for this particular patch site, patching is completed as for all other locations but a flag is set to ignore any errors which may be detected for this location.

Any interrupts are blocked during the patching of a load object, and unblocked for servicing between patching of a load object, ensuring that a load object is either patched correctly or not patched at all. Issuing of a check command by the user during the time the program is active will not enable the patching of any load object active on the stack at that time. However, an uncheck command issued while the program is active will cause the "do not report the error" flag to be set for this location. This step completes the initial patching implemented on a process as the process is about to run.

Essentially, all the steps illustrated in FIG. 2 from steps 100 to 160 are performed when the user wishes to run the target program (i.e. execute the process) within the debugger program. In sum, steps 100 through 160 completes the patching for all the load objects that exist at the time the program is started.

In addition, the debugger program is able to load new load objects dynamically which were not in the program at the time the program was started. The system traps all calls to new load objects, and when the debugger program sees that a program is about to load a new object, the debugger program goes through a similar set of steps. The steps 110, 120, 200, 140, 150, 160 and 170 illustrate dynamic loading of a new load object. The steps are identical to the previously followed steps except there is no initialization. The global initialization is performed once only and then these steps are performed for each new load object that are dynamically loaded.

As illustrated in steps 175, 180 and 185 the debugger program is able to also de-install the patches and dynamically unload load objects. When a de-install command is received steps 175, 180 and 185 are executed. At step 175, given a patched function, the page containing the patch site to be de-installed as well as the page containing the corresponding section of the patch area are read. The original instruction is then obtained from the section of the patch area and the branch to patch area instruction in the patch site is replaced by this original instruction. In addition to this replacement of the patch instruction in the patch site, user breakpoints at these patch sites will require replacing the patch instruction in the breakpoint data structure associated with the patch site as well. In the event that the patch site was not patched, a warning is issued to the user and nothing is de-installed. The user issuing the check command will merely replace the instruction at the patch site with the branch to patch area instruction.

In step 180, at the programmer's option, space allocated for the load object may be de-allocated. The dynamic de-allocation is done in order to save address space. If a large number of new load objects are being loaded in, there may not be any empty address space. Given a module that is no longer needed, it may be more advantageous to de-allocate such space for potential use. Finally, in step 190, the patch tables are updated with the information on the de-allocated sections of the patch area.

Figure 3:
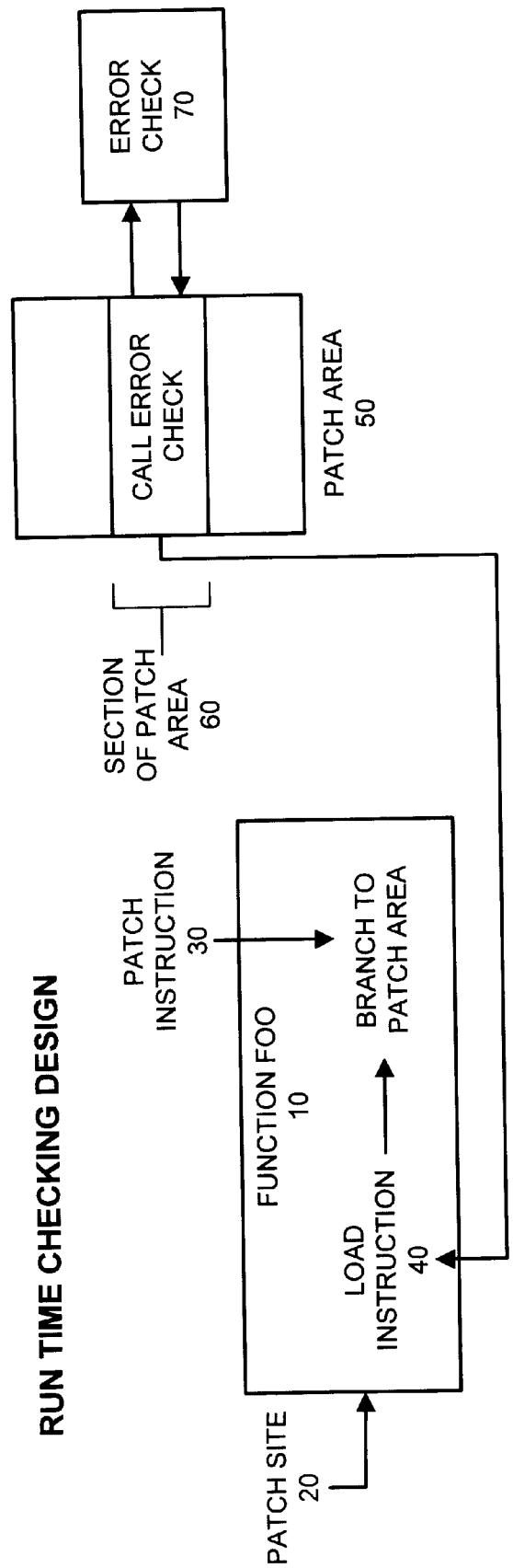
FIG. 3 illustrates dynamic patching for the run-time error checking method.

As described, this patching operation is the same whether the process will be executed in a multi-threaded mode or a single thread mode with one exception. If the target process will be executed as a multi-threaded process there will be different library modules (for example, libthread) called:

FIG. 3 illustrates the dynamic patching for the run-time error checking method used in the Sun dbx debugger. A target program consists of a number of load objects and in turn the load objects contain a number of functions, and, function 10 as function foo, is one example. Such function will have a number of memory access-related instructions. One such instruction is illustrated as load instruction 40. The run-time checking (RTC) module will patch each and every such instruction for every load object that it is patching. This run-time checking (RTC) module scans each and every individual instruction that needs to be patched, as was illustrated by Box 130 of FIG. 2, and the original instructions are then replaced by unconditional branch instructions to the patch area. The location of the instruction that is patched is called "the patch site" 20. Therefore, if there was a load instruction at a location within a load object then that location would be called "a patch site" 20. The memory locations where the error checking is done is called "the patch area" 50. For each patch area 50, there will be one or more sections of the patch area 60, each section corresponding to a unique patch site. Therefore if there are 1,000 patch sites, there will be 1,000 sections of the patch area.

For each instruction that is replaced within the load object, there is an instruction to branch to the corresponding section of the patch area 60. Thus, there is a custom section of the patch area 60, in a given patch area 50 that is assigned to the whole load object for each patch site 20 and each patch site 20 is replaced with a branch to its own custom section in the patch area 60. These sections of the patch area 60 consist of several instructions which are basically set up to call some real checking codes 70 in a separate area in memory. In the preferred embodiment, this real checking code 70 is designated the library routine "librtc.so". Thus, "librtc.so" is called from the patch area 50 which performs the checks. If there are any errors to report, "librtc.so" will record the error in an error buffer from which the debugger program will report them, otherwise the process is returned to the patch area 60 and in turn the process is returned to the next instruction that will be executed in the user program. There are different types of sections of the patch area depending upon the types of instruction being patched. There are also several different kinds of cases due to delayed branch instructions that have to be handled separately. Therefore sections of the patch area 60 are not identical and the "librtc.so" routine may make different kinds of tests depending on the different ways in which it is called by the instrumenting instructions in the section of the patch area 60. In summary, a section of the patch area is specifically for one particular patch. FIG. 3 illustrates a process in which patch sites are replaced by branches to a section of the patch area 60 and a further branch to a checking code 70 and back to the next instruction to be executed in the user program. There are other cases that may modify the illustration in FIG. 3. For example, if an instruction to be patched was in a delay slot of a branch, i.e., a delayed branch instruction, then after branching to the patch area and the checking code, the process should branch to the address location the process was supposed to branch to prior to the error checking instead of branching back to the next instruction in sequence. In order to handle a target application process written for multi-threading (MT), several of these patch areas and error check routings must be modified as will be described in more detail below. To understand these modifications it is first necessary to describe a typical multi-processing environment.

The Multi-processing Environment

Figure 4:
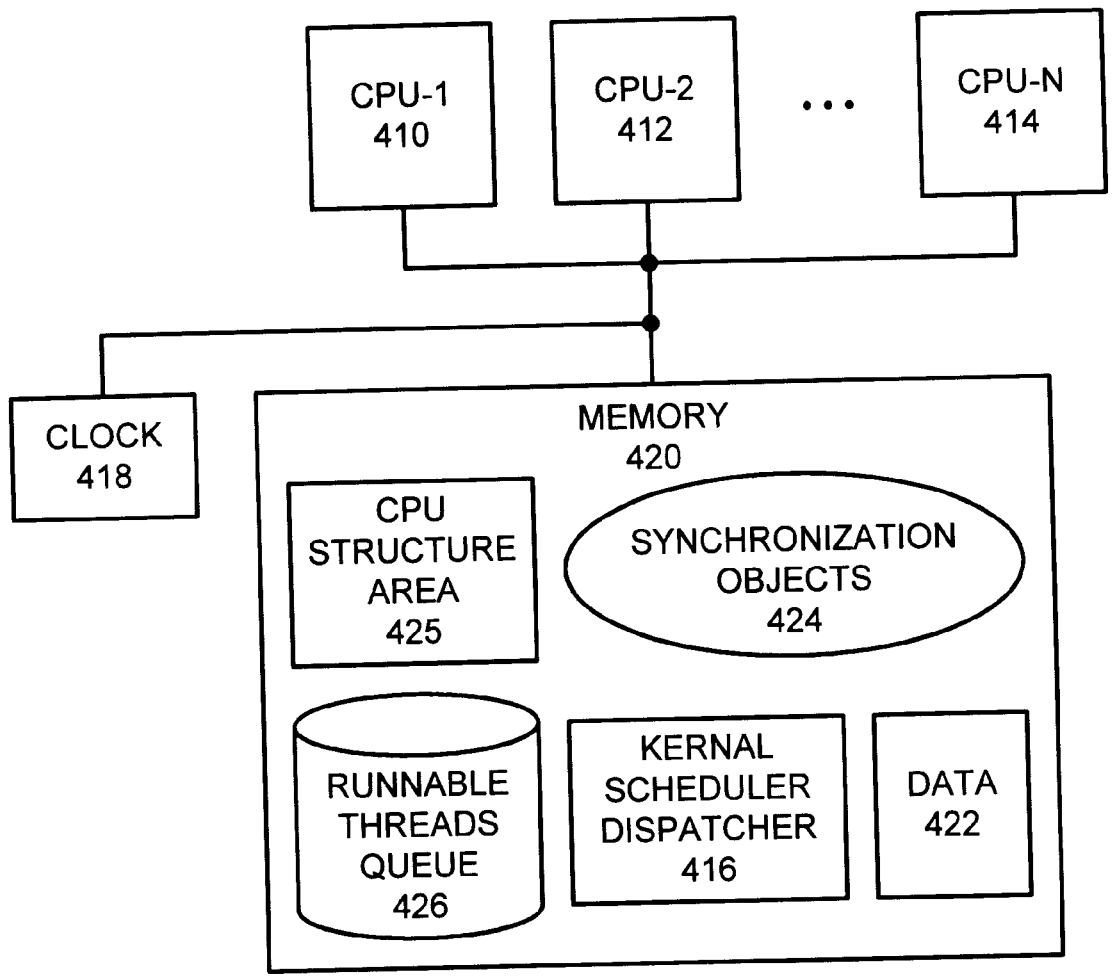
FIG. 4 illustrates a configuration of a typical multi-processor system.

FIG. 4 depicts a representative multi-processor machine configuration which would be typical for use with a multi-threaded target program. It should be noted however that multi-threaded programs can run on single-processor systems as well as multi-processor systems but they just do not run as efficiently on a single-processor system. The present invention, RTC/MT can run on either type of system. In the preferred embodiment SunOS 5.0 is the operating system used which is part of the Sun Solaris Operating Environment. SunOS 5.0 is intended to run on tightly-coupled shared memory multi-processor systems with one or more processors. Referring now to FIG. 4, the typical multi-processor computer system is assumed to have one or more central processor units (CPUs)410,412,414 sharing a memory 420 and clock 418. The operating system kernel 416 assumes all processors are equivalent. Processors 410, 412, 414 execute kernel threads selected from the queue of runnable kernel threads 426. If a particular multiprocessor implementation places an asymmetric load on the processors (e.g., interrupts) the kernel 416 will nonetheless schedule threads to processors 410,412,414 as if they were equivalent. In general, all processors 410,412,414 see the same data in memory 420. This model is relaxed, somewhat, in that memory operations issued by a processor 410,412,414 may be delayed or reordered when viewed by other processors. In this environment, shared access to memory is preferably protected by synchronization objects 424. (The data locking mechanisms are also sometimes called synchronization variables or synchronization primitives). The exception is that single, primitive data items may be read or updated atomically (e.g. all the bytes in a word change at the same time). (A "word" is a four byte piece of data.) The shared memory 420 is assumed to be symmetrical. Thus the kernel 416 currently does not ensure that processes scheduled on a particular processor 410 (for example), are placed in a particular piece of memory 420 that is faster to access from that processor 410. It is possible for a kernel 416 to run "symmetrically" on a multiprocessor yet not allow more than one processor 410,412,414 to execute kernel code 416. This is clearly not a strategy that scales well with increasing numbers of processors, and in the preferred embodiment of the present invention, all of the processors 410,412,414 in the system can execute the shared kernel code 416 simultaneously, and use the data structures in the shared memory 420 to communicate between the processors 410, 412, 414 as required. Accordingly, when debugging a process that may have multiple threads concurrently accessing the same memory location it is essential for the debugger to be able to tell whether the memory location is allocated to some thread other than the thread which accessed it. That is, the memory location being accessed by thread 1 may be on the stack of thread 2 and if so is a valid memory location. The prior art debuggers would report this latter case as a memory access error incorrectly.

Continuing with FIG. 4, the "cpu structure area" 425 contains a data structure for each processor 410, 412, 414. These per-processor structures contain per-processor data, such as: currently executing thread, idle thread, current dispatching priority, and interrupt handling information.

SunOS 5.0 is designed with a relatively "fine grained" locking strategy to take advantage of as many processors 410, 412, 414 as possible. Each kernel subsystem has a locking strategy designed to allow a high degree of concurrency for frequent operations. In general, access to data items 422 are protected by locks as opposed to locking access to entire routines. Infrequent operations are usually coarsely locked with simple mutual exclusion. Overall, SunOS 5.0 has several hundred distinct synchronization objects 424 statically, and can have many thousands of synchronization objects 424 dynamically. Kernel threads synchronize via a variety of synchronization objects or primitives, such as:

Mutual exclusion (mutex) locks,

Condition variables,

Counting semaphores,

Multiple readers, single writer (readers/writer) locks.

The mutex and writer locks support a dispatching priority inheritance protocol which prevents lower priority threads from blocking higher priority threads (priority inversions).

By way of additional information on threads, it is necessary to define a "process" in the UNIX Operating System environment.

The UNIX® Operating System which is the basis for the SunOS 5.0 (Solaris) Operating System, is currently used on thousands of computer systems throughout the world. UNIX is a registered trademark in the United States and other countries, exclusively licensed through X/OPEN Ltd. UNIX was designed to be a simple time-sharing system, with a hierarchical file system, which supported multiple "processes." A "process" is the execution of a program and consists of a pattern of bytes that the CPU interprets as machine instructions (text), data, and stack. (A "stack" is a set of hardware registers or a reserved amount of main memory that is used for arithmetic calculations or for keeping track of internal operations. Stacks usually work on a last-in-first-out basis; the last item, or address, placed (pushed) onto the stack is the first item removed (popped) from the stack). Several processes may be instances of a single program. Processes communicate with other processes and the kernel via "system calls." A process can execute in both "user" mode and "kernel" mode and so has a separate stack for each mode. The "context" of a process or its "state" is defined as:

its text, values of global user variables and data structures, values of registers, values stored in its process table slot and "u area", and the contents of its user and kernel stacks.

The "process table" and "u area" are both data structures which describe the state of the process. Switching from user mode to kernel mode in the same process does not require a "context switch", however when switching from process "A" to process "B" a context switch must be made. A "context switch" requires the kernel to save all of the registers and values so that when a process is reinitiated it will resume from the spot where it was executing when an earlier context switch was made.

This concept of "process" is extended to "threads" and "multi-threading" systems. A "thread of control" or more simply a "thread" is a sequence of instructions being executed in a program. A thread has a program counter (PC) and a stack to keep track of local variables and return addresses. Threads execute independently. Threads share the process instructions and most of its data, as well as share most of the operating system state of a process. Each thread may make arbitrary system calls. The Operating System controls the execution of threads by dispatching and scheduling them on which ever of the processors (CPUs) are available. Threads and the associated control and services of a multithreaded system (including synchronization services) may be implemented as objects. Synchronization techniques which are implemented as objects include mutual exclusion (mutex) locks, semaphores, condition variables, and readers/ writer locks. Because the earlier RTC testing capabilities of uni-processor designed systems were not designed to handle multiple threads they would erroneously signal certain memory locations to be invalid because the RTC system was unaware that other threads were in operation on other processors which might affect or have affected the status of the specified memory location.

Modifications of the RTC to Handle Multiple Threads.

As indicated above, the preferred embodiment of the present invention makes use of the Sun Solaris Operating System, the Sun SPARCWorks debugger ("dbx" debugger) which includes the run-time-checking (RTC) routine, which itself makes use of the generalized memory status maintenance and memory status checker capabilities of the library routine "librtc.so". A target application program is loaded into a machine for testing under the control of the debugger and when run-time-checking is specified by the user, the RTC section of the debugger patches the target application program process and the "librtc.so" library routine is used in various ways and modes by each type of memory access patch code to maintain memory status and to check memory access. In order to modify this system to handle multi-threaded target application program processes, it was necessary to make the following general modifications to the uni-processor debugger/RTC system:

Solaris Operating System

No modifications necessary as the current version of the Operating System is designed to handle multi-threaded systems and multi-processor hardware systems.

SPARCWorks debugger ("dbx")

This routine was modified to recognize the target application program process is a multi-threaded type and link in and dynamically load library routine "libthread_db". It should be noted that library routine "libthread" is linked with the user's target application program. The routine "libthread_db" contains information about running threads such as thread ID
register set for this thread
stack for this thread
Program Counter
thread specific data keys
signal mask
pending signal The error reporting section of this routine was modified to report errors in terms of a thread ID and to obtain that thread's errors from the thread specific error buffer.

Run-Time-Checking ("RTC") section of dbx

The RTC section was modified to first identify whether the user target application program ("target program") is multi-threaded. This is done by checking to see if the target program is linked to the "libthread" library. If so, then RTC checks to see if (1) dbx is able to find and load the appropriate modified version (see below) of "libthread_db"; and (2) if the target program is linked with the appropriate, modified version of "libthread". As indicated below, both "libthread" and "libthread_db" were modified and extended especially to work with the present invention RTC/MT. Once these supporting libraries are found, RTC was also modified to initialize library routine "librtc.so" and to inform it that the target program is multi-threaded.

RTC was also modified so that when it is in the "memory leak checking" mode it will iteratively check the stack and register set for each thread to look for pointers to previously allocated memory so as to update the leak status data.

The library Routine "librtc.so"

Since all threads allocate space from the same "heap" area, librtc.so was modified to manage the concurrent allocation and freeing of memory space by the threads by monitoring the execution of "malloc" "realloc" and "free" commands by threads. These heap memory allocation and deallocation functions use synchronization primitives to permit only one thread at a time to manipulate the heap data structures that keep track of the disposition of heap memory.

Space of the stack of a thread is memory that can be accessed legally. The code in librtc.so was modified to be aware of the stacks of all of the threads so that memory accesses to space on and off those stacks could be correctly checked. Stacks grow and shrink as different functions in the thread are called and return. The code in librtc.so detects the growth or shrinkage of a stack by comparing its last known value with its current value. If the stack has grown, librtc.so adjusts its internal data structure to reflect the fact that additional memory is legally allocated. If the stack has shrunk, librtc.so recognizes that less memory is legally allocated.

Librtc.so was also modified to be MT safe. That is, synchronization locks were inserted in critical code areas so that concurrent accesses to librtc.so by different thread location tests could be handled consistently. Librtc.so maintains a data structure of memory status that keeps track of access rights (read only, write only, read/write, no access). This data structure cannot safely be changed by more than one thread at a time and thus these data structures needed to be protected from concurrent access by threads. Synchronization primitives (locks) were placed around the code that accesses these data structures to maintain data consistency.

Librtc.so was modified to add wrappers for key libthread functions so that librtc.so could interpose on calls to these functions. Once such a call to a libthread function was intercepted, librtc.so would check to see if the parameters (i.e. arguments to the function call) being passed can legally write/read from the target memory.

Librtc.so code calls functions that have been instrumented for RTC. If librtc.so code calls a function that has been instrumented there is a possibility that a deadlock can occur because of the synchronization primitives added to the librtc.so code. For example, if librtc.so acquires a lock and then as a result of calling a function, enters librtc.so code again and tries to acquire the same synchronization primitive again, a deadlock occurs. To avoid this deadlock, librtc.so was modified to disable itself (i.e. does not perform its error checking functions) when it is executing code in other libraries. Each thread maintains a flag which indicates whether error checking is done or is disabled.

Other Routines Modified

Library routines "libthread_db" and "libthread" as described above were themselves modified. The latter "libthread", which allows the processes to create threads and manage threads was modified to provide a function that returns information about the location and size of a thread's stack. This function in libthread is used by code in librtc.so. The routine "libthread_db" which provides information about running threads as described above, such as thread ID and register set and stack was modified to provide dbx with information on stack size and location for a thread.

Figure 5:
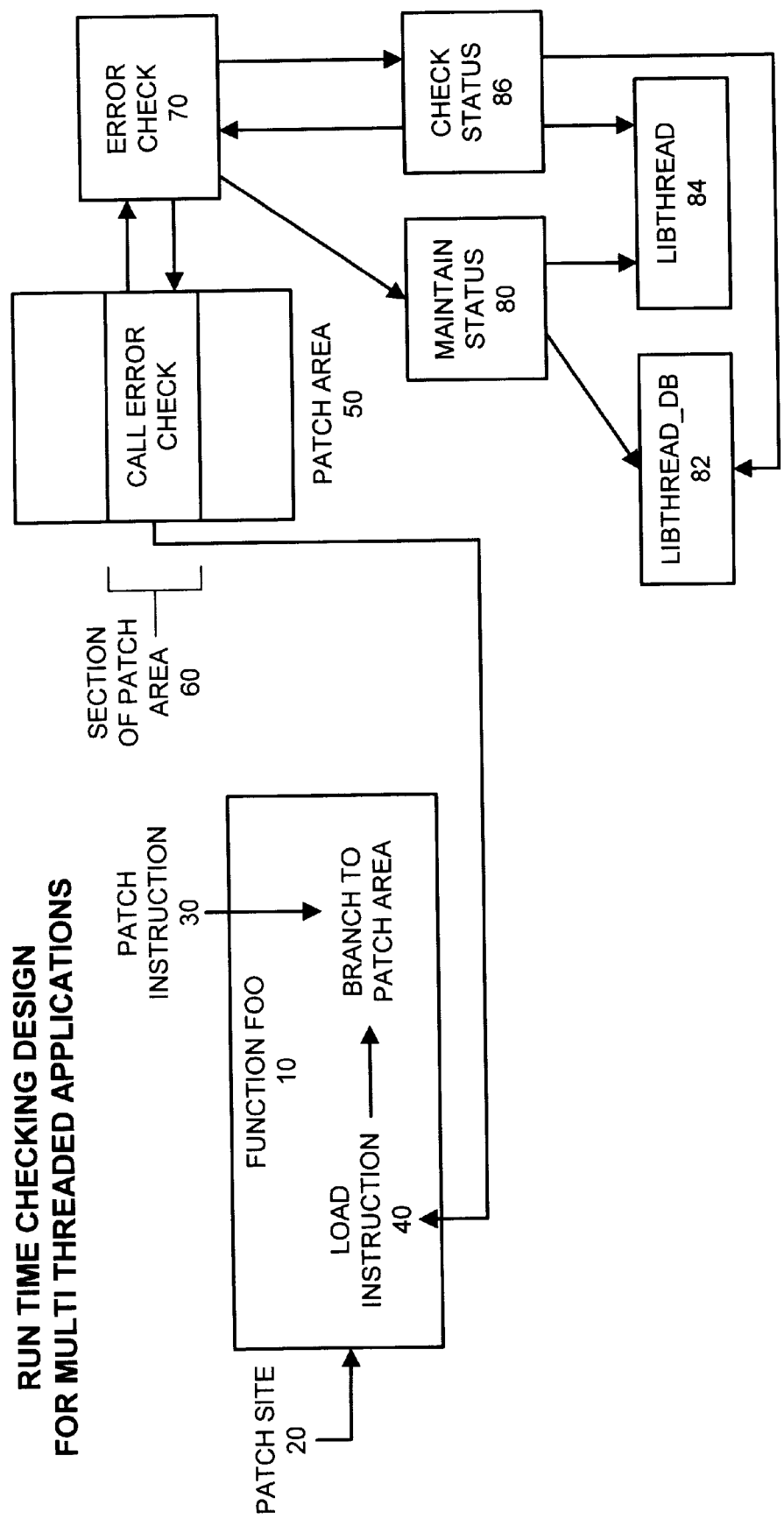
FIG. 5 illustrates the general changes required to the uni-processor run-time-checking system to accommodate a multi-processing environment.

Referring now to FIG. 5, a pictorial view of some of the modifications made to the existing RTC system are shown. When the routine "librtc.so" 70 is called it must determine whether it is in the uni-processor or multi-threaded mode. If in the uni-processor mode then processing continues as described above relative to FIG. 3. If in the multi-threaded mode, "librtc.so" must do its memory status maintenance 80 and checking 86 on a "per-thread" basis, maintaining information about each thread such as thread ID, thread's stack size, stack base address, stack limit which is gets from the modified "libthread" routine 84. Note that the dbx RTc routine also needs such per-thread information at leak checking time, which it gets from the modified "libthread_db" routine 82.

The Preferred Embodiment

Figure 6:
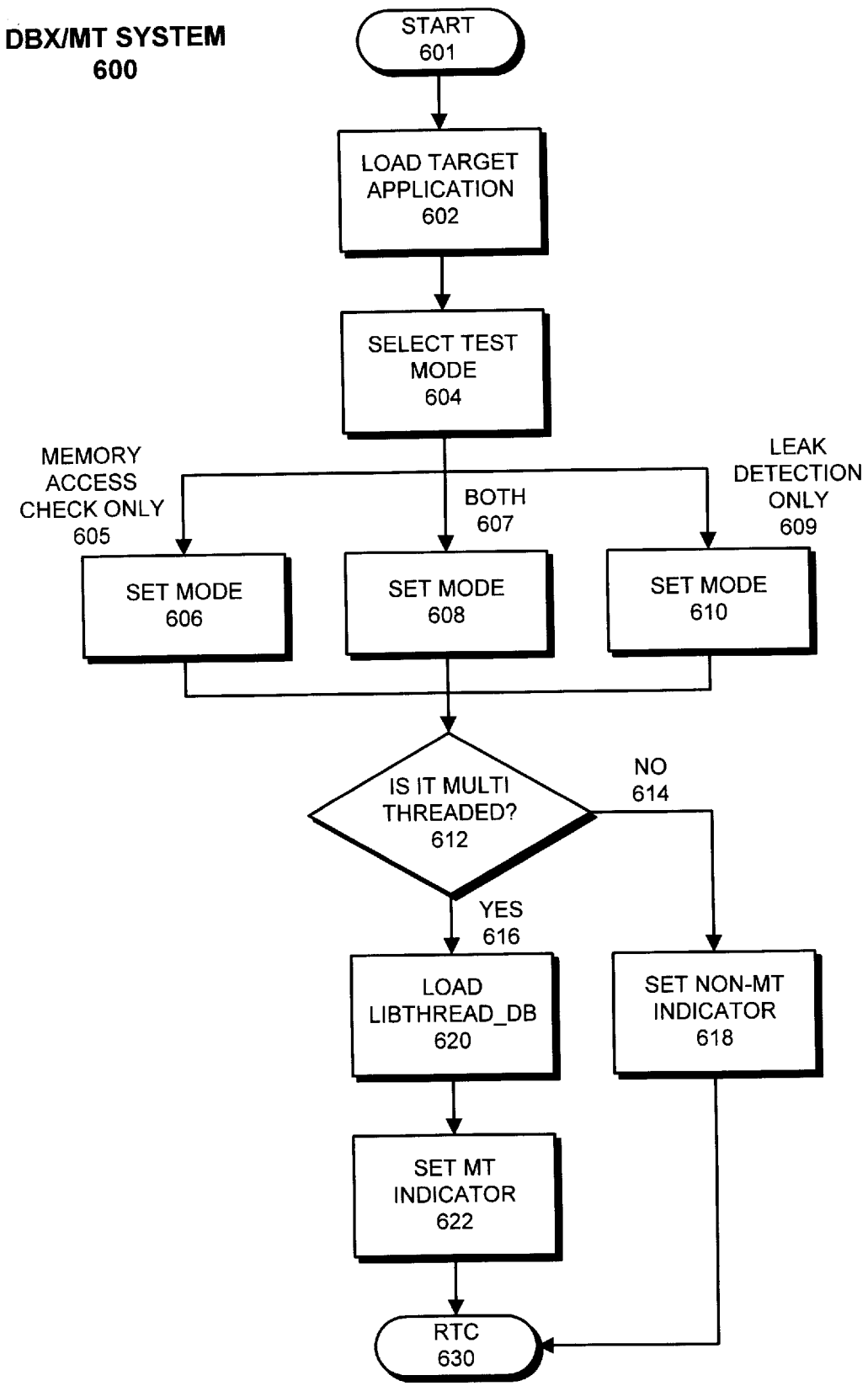
FIG. 6 illustrates in block diagram form the steps performed by the basic debugger to accommodate multi-processing.

Referring now to FIG. 6 the steps performed by the basic debugger ("dbx") are depicted 600. On beginning a debugger test run the target application object code is loaded into a machine under the control of dbx 602. The user selects a test mode 604 indicating whether he/she wants to do memory access checking only 605 or memory leak detection only 609 or both 607. Whatever the selection the dbx sets a mode indicator 606, 608, 610 and continues. The dbx then determines whether the target application is a multi-threaded application or not 612. If the target application is not a multi-threaded application 614 the dbx sets a single-threaded (or non-MT) indicator 618 and continues 630 calling the RTC section for further processing. If the target application is a multi-threaded application 616 dbx loads the additional multi-threaded library "libthread_db 620 if it is not already loaded. The dbx sets the multi-threaded test indicator and continues 630 calling the RTC section for further processing.

Figure 7:
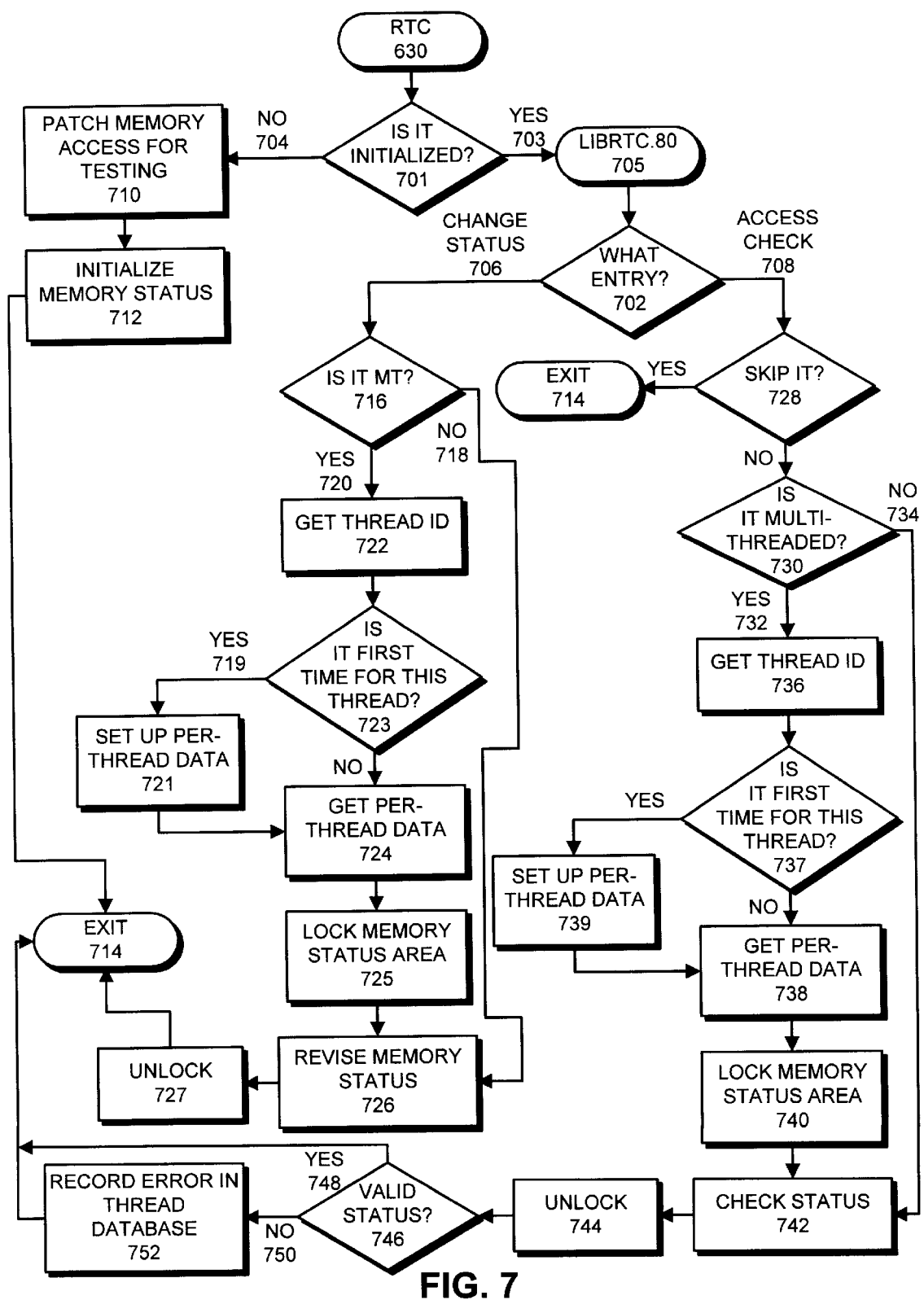
FIG. 7 illustrates in block diagram form the steps performed by the Run-time-checker (RTC) and "librtc.so" portions of the basic debugger to accommodate multi-processing when doing memory access checking.
Figure 8:
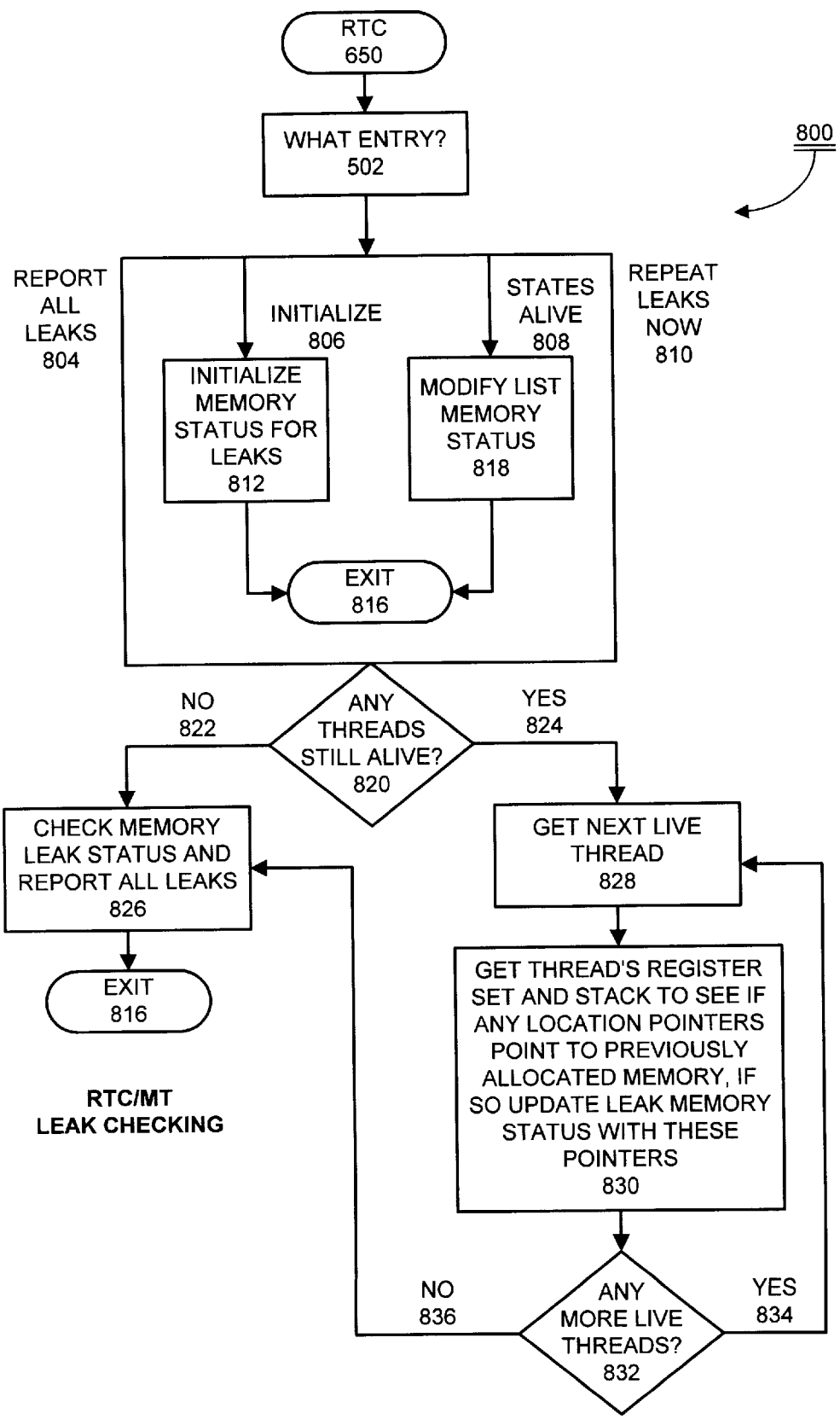
FIG. 8 illustrates in block diagram form the steps performed by the RTC and "librtc.so" module basic debugger to accommodate multi-processing when doing memory leak checking.

Referring now to FIG. 7, testing steps performed by RTC and the test routine "librtc.so" are depicted 700. When RTC is entered 630 RTC checks to see if the memory access status has been initialized 701. If so 703 control is transferred to "librtc.so" 705 which checks the entry status 702 and determines whether it is to revise memory status as a result of having encountered a "malloc" or "free" command 706, or whether this is a memory access check entry 708. Other entries to the RTC routine for memory leak detection processing are shown in FIG. 8 and described in detail below. Returning to FIG. 7, If the entry to RTC is the initialization entry 704 then the target application program process is patched and instrumented for memory access checking 710 and the memory status array is initialized 712 as described in the basic RTC description relative to FIGS. 1–3 above, with RTC returning thereafter to dbx 714. If the RTC entry is a memory status update entry 706 then an indicator is tested to see if this is a multi-threaded application 716 and if not 718 the memory status array is updated normally 726 and the return to dbx 714 is executed. If it is a multi-threaded application 720 then "libthread" is called to get the current thread D) 722. If this is the first time RTC encounters a thread 719, then RTC allocates storage for the per-thread data which includes the thread's ID, stack start address, stack limit, stack size, current stack pointer, a flag to indicate whether RTC is ON/OFF at that moment for that thread, error message buffer, and a flag to indicate whether the thread has been seen by RTC before 721. This per-thread data is maintained in a table, where each entry in the table corresponds to data for a unique thread. As threads get created and destroyed, entries in the table get dynamically allocated and freed. RTC accesses this per-thread data from the table by the thread ID, which serves as the key index into the table. Note that multiple threads can enter RTC concurrently. However critical sections of the RTC code and shared global data in RTC are protected via synchronization primitives (locks). For example, continuing in FIG. 7, after getting the per-thread data 724 the code in RTC is then locked 725 so that another thread will not enter until the memory status is updated 726 and then unlocked 727 and the return to dbx 714 is executed.

If the entry to RTC is a memory access check 708 then RTC tests to see if memory accesses are to be tested or skipped 728 (the user can designate locations to be tested or not). If access checking is to be skipped then RTC is exited 714. If access checking is not to be skipped then RTC again tests whether it is a multi-threaded application 730. If it is not 734 then librtc.so does the normal (no threads) memory status test 746, records any errors if any 752 and exits 714. If the multi-threaded indicator is on 732 then the current thread ID is obtained from "libthread" 736, and similar to the above, if it is the first encounter by RTC with this thread 737, then RTC allocates storage for the per-thread data which includes the thread's ID, stack start address, stack limit, stack size, current stack pointer, a flag to indicate whether RTC is ON/OFF at that moment for that thread, error message buffer, and a flag to indicate whether the thread has been seen by RTC before 739. This per-thread data is maintained in a table as indicated above. The code in the RTC is then locked 740 so that an uninterrupted status check 742 may be made for the indicated location and then the checking code in RTC is unlocked 744. After the memory location's status is checked, the status is assessed for validity 746 and if valid 748 RTC is exited 714. If the location was found to be invalid 750 then an error message is recorded in the error buffer for the thread in question 752 recording the thread ID and the error type and location. Thereafter the RTC is exited 714. Note that the recorded error messages are typically displayed at the end of the debugging run or they can be displayed to the user as they are encountered. The user may specify which option he prefers by interacting with the debugger interface screen.

The dbx debugger and its RTC section has the capability of maintaining status for memory locations in order to detect "memory leaks." A "memory leak" is defined as a memory location which was allocated at some time (by creating a pointer to the location for example) but which no longer is capable of being accessed and yet the location has not been freed (i.e. unallocated; made available for further use.). This could happen for example by the pointer to the location getting changed without freeing the original location, or the routine containing the pointer simply being exited without freeing the location. Keeping track of such happenings in order to inform the user/developer of such inaccessible locations is the function of the "memory leak detection" feature of RTC. The user can specify that he/she wants all leaks displayed at the end of the debug run or at anytime he can specify "show leaks." Referring now to FIG. 8, the functions of RTC to handle memory leak detection in a multi-threaded environment 800 are depicted. When RTC is entered 630 it checks the entry type 802 and determines whether the entry is to report all leaks 804, report leaks now 810, change memory leak status 808 or initialize the memory leak status area 806. If it is an initialization entry 806 the memory area used by RTC for keeping track of leaks is initialized 812 and the program exits 816. If the entry is to update the memory leak status area 808 then the status is updated 818 and the program exits 816. The other two entries, report all leaks 804 and report leaks now 810 function the same way the only difference is the former occurs at the end of the debug run and the latter can occur at any time. Both entries go to check whether any threads are still alive 820. Typically at the end of the debug run all threads should be completed. If no threads are alive 822 then the leak memory status area is checked and all designated leaks are reported 826 and the program exits 816. Then dbx uses libthread-db to determine if there are any threads still active 824, (since libthread_db provides a function for listing all active threads and since dbx maintains this list of all threads that have been created by the user process), and then RTC gets the next live thread ID from this list of active threads 828 and using that thread ID gets that thread's register set, thread stack size, and stack start address from libthread_db and checks these to see if they contain any pointers to previously allocated memory and if so then the leak memory status area is updated to make locations corresponding to any found pointers be designated as "no leak." 830. The RTC program then checks to see if there are any more remaining live threads 832 and if so steps 828 and 830 are repeated. If all live threads have been checked 836 then the memory leak status area is checked and all leaks reported 826 and the program exits 816.

The preferred embodiment of the run-time-checking system for multi-threaded programs (RTC/MT) has been described in terms of specific procedures, structures (such as a typical multiprocessing hardware configuration), tests and in the framework of the Sun SPARCWorks debugger with a specific implementation of the Sun run-time-checking (RTC) feature and using specific Sun library routines such as "libthread" and "libthread_db". However, those skilled in these arts will recognize that all of these functions may be realized on various kinds of uni- or multi-processing hardware systems with various Operating Systems capable of executing multi-threaded applications. Similarly other equivalent testing systems may not use libraries such as "libthread" and "libthread_db" to get the current thread ID and thereafter get that thread's stack, error buffer and register set and instead may use other devices for perceiving the existence of threads such as testing the thread stack size to see if it has grown beyond an expected size. Such apparently large stack sizes can be used as an indicator of a new stack and therefore a new thread. All such equivalent schemes are deemed to be equivalent to the preferred embodiment disclosed herein and claimed as follows.

What is claimed is:

1. A method for memory access checking of a multi-threaded target program, said method executable on a computer system having a memory, a clock, one or more central processing units (CPUs), an I/O device for receiving inputs, an I/O device for sending outputs to, and at least one peripheral device, said computer system having program machine instructions in said memory, said computer system also having a multi-threaded operating system, said method comprising the steps of:

providing a multi-threaded safe ("MT safe") debugger program having memory access checking facilities, where being "multi-threaded safe" means that the debugger program itself is capable of handling multiple accesses of its routines in a safe way, and wherein the MT safe debugger program can operate in conjunction with said multi-threaded operating system;

providing memory status information for memory locations in said memory, said memory status information indicating at least whether a memory location is in an allocated state or in an unallocated state, wherein said allocated state corresponds to a memory location allocated by a computer program and said unallocated state corresponds to a memory location not allocated by said computer program, said status information being maintained by said MT safe debugger program; and under the control of said computer system, said MT safe debugger program checking said memory status information for each memory location accessed by said multi-threaded target program.

2. The method of claim 1 wherein said MT safe debugger program maintains said memory status information in a multi-threaded safe manner by using synchronization primitives to lock-out concurrent accesses to it until said memory status is updated or checked for a current thread, after which time said accesses are unlocked.

3. The method of claim 1 wherein said checking for an error when said status information for said memory location accessed indicates an unallocated state is done on a per-thread basis.

4. The method of claim 1 comprising the additional step of reporting an error if said status information for said memory location accessed indicates an unallocated state.

5. The method of claim 4 wherein said reporting of an error when said status information for said memory location accessed indicates an unallocated state is done on a per-thread basis.

6. The method of claim 1 comprising the additional steps of:

providing memory leak status information for memory locations in said memory, said memory leak status information indicating at least whether a memory location is in an inaccessible state or not, wherein said inaccessible state corresponds to a memory location which is in an allocated state but which is inaccessible in said multi-threaded target computer program, said memory leak status information being maintained by said MT safe debugger program; and under the control of said computer system, said MT safe debugger program checking said memory leak status information and reporting said memory locations designated as in said inaccessible state.

7. The method of claim 1 wherein said memory accesses may be either a read access or a write access and wherein said memory status information maintained by said MT safe debugger program comprises allocated states designated as read-only, write-only, and read or write access.

8. A method for memory leak checking of a multi-threaded target program, said method executable on a computer system having a memory, a clock, one or more central processing units (CPUs), an I/O device for receiving inputs, an I/O device for sending outputs to, and at least one peripheral device, said computer system having program machine instructions in said memory, said computer system also having a multi-threaded operating system, said method comprising the steps of:

providing a multi-threaded safe ("MT safe") debugger program having memory leak checking facilities, which can operate in conjunction with said multi-threaded operating system;

providing memory leak status information for memory locations in said memory, said memory leak status information indicating at least whether a memory location is in an inaccessible state or not wherein said inaccessible state corresponds to a memory location which is in an allocated state but which is inaccessible in said computer program, said leak status information being maintained by said MT safe debugger program; and under the control of said computer system, checking said memory leak status information.

9. The method for memory leak checking of a multi-threaded target program of claim 8 having an additional step of reporting to a user said memory locations designated as in an inaccessible state.

10. A computer system for memory access checking of a multi-threaded target program, one or more central processing units (CPUs) and having program machine said computer system comprising:

a memory;

a clock;

at least one central processing unit;

a plurality of program machine instructions loaded into said memory;

a multi-threaded operating system loaded into said memory;

at least one I/O device for receiving inputs;

at least one I/O device for sending outputs to;

at least one of peripheral device;

a multi-threaded safe ("MT safe") debugger program having memory access checking facilities, loaded into said memory and coupled to said multi-threaded operating system;

a multi-threaded target program loaded into said memory under control of said MT safe debugger;

one of said one or more CPUs for executing said multi-threaded operating system and said MT safe debugger to test said multi-threaded target program, said MT safe debugger having a first machine executable mechanism which provides memory status information for memory locations in said memory, said memory status information indicating at least whether a memory location is in an allocated state or in an unallocated state, wherein said allocated state corresponds to a memory location allocated by a computer program and said unallocated state corresponds to a memory location not allocated by said computer program, said status information being maintained by said MT safe debugger program during said test of said multi-threaded target program; and said MT safe debugger having a second machine executable mechanism which checks said memory status information for each memory location accessed by said multi-threaded target program.

11. The computer system of claim 10 further comprising a reporting mechanism for reporting of an error when said status information for said accessed memory locations are in an unallocated state.

12. The computer system of claim 10 wherein said checking for an error when said status information for said memory location accessed indicates an unallocated state is done on a per-thread basis.

13. The computer system of claim 11 wherein said reporting of an error when said status information for said memory location accessed indicates an unallocated state is done on a per-thread basis.

14. The computer system of claim 10 wherein said memory accesses may be either a read access or a write access and wherein said memory status information maintained by said MT safe debugger program comprises allocated states designated as read-only, write-only, and read or write access.

15. The computer system of claim 10 wherein said checking for an error if said status information for said memory location accessed indicates an unallocated state is done on a per-thread basis.

16. The computer system of claim 10 further comprising:
a third machine executable mechanism coupled to said MT safe debugger which provides memory leak status information for memory locations in said memory, said memory leak status information indicating at least whether a memory location is in an inaccessible state or not wherein said inaccessible state corresponds to a memory location which is in an allocated state but which is inaccessible in said computer program, said memory leak status information being maintained by said MT safe debugger program; and
a fourth machine executable mechanism coupled to said MT safe debugger which checks said memory leak status information.

17. The computer system of claim 16 further comprising a reporting mechanism for reporting said memory locations designated as in an inaccessible state.

18. A computer system, comprising:
a memory;
a clock;
at least one central processing unit;
a plurality of program machine instructions loaded into said memory;
a multi-threaded operating system loaded into said memory;
at least one I/O device for receiving inputs;
at least one I/O device for sending outputs to;

at least one peripheral device;
a multi--threaded safe ("MT safe") debugger program having memory leak checking facilities, loaded into said memory and coupled to said multi-threaded operating system;
a multi-threaded target program loaded into said memory under control of said MT safe debugger;
one of said one or more CPUs for executing said multi-threaded operating system and said MT safe debugger to test said multi-threaded target program, said MT safe debugger having a first machine executable mechanism which provides memory leak status information for memory locations in said memory, said memory leak status information indicating at least whether a memory location is in an inaccessible state or not wherein said inaccessible state corresponds to a memory location which is in an allocated state but which is inaccessible in said computer program, said leak status information being maintained by said MT safe debugger program during said test of said multi-threaded target program; and said MT safe debugger having a second machine executable mechanism which checks said memory leak status information for each memory location accessed by said multi-threaded target program.

19. The computer system of claim 18 wherein said second machine executable mechanism which checks said memory leak status information for each memory location accessed by said multi-threaded target program performs said checking on a per-thread basis.

20. The computer system of claim 18 further comprising a reporting mechanism for reporting of said memory locations which are designated as in an inaccessible state, said inaccessible locations designated as memory leaks.

21. The computer system of claim 20 wherein said reporting mechanism which reports said memory leak status information for each memory location accessed by said multi-threaded target program performs said reporting on a per-thread basis.

22. A debugger in a computer readable medium for providing a multithreaded safe ("MT safe") mechanism for run-time-checking ("RTC") a multi-threaded target program, said debugger operating in a computer system having a memory, a clock, one or more central processing units (CPUs), an I/O device for receiving inputs, an I/O device for sending outputs to, and at least one peripheral device, said debugger comprising:
a first machine executable structure for maintaining status of memory locations in a computer system, said memory status information indicating at least whether a memory location is in an allocated state or in an unallocated state, wherein said allocated state corresponds to a memory location allocated by a computer program and said unallocated state corresponds to a memory location not allocated by said computer program, said status information being maintained by said MT safe mechanism during a test of said multi-threaded target program; and
a second machine executable structure which checks said memory status information for each memory location accessed by said multi-threaded target program.

23. A debugger as articulated in claim 22 wherein said second machine executable structure performs said checks of said memory status information for each memory location accessed by said multi-threaded target program on a per-thread basis.

24. A debugger as articulated in claim 22 further comprising a reporting mechanism for reporting an error if said status information for said memory location accessed indicates an unallocated state, said second machine executable structure under control of said MT safe mechanism.

25. A debugger as articulated in claim 24 wherein said reporting mechanism performs said reporting of said memory status information for each memory location accessed by said multi-threaded target program on a per-thread basis.

* * * * *

UNITED STATES PATENT AND TRADEMARK OFFICE
CERTIFICATE OF CORRECTION

PATENT NO : 5,953,530
DATED      : 9/14/1999
INVENTOR(S): Rishi, et al.

It is certified that an error appears in the above-identified patent and that said Letters Patent is hereby corrected as shown below:

In column 18, lines 46-47, please delete the following words,

"one or more central processing units (CPUs) and having program machine".

Signed and Sealed this

Eighteenth Day of April, 2000

*Attest:*

Q. TODD DICKINSON

*Attesting Officer*    *Director of Patents and Trademarks*